Figures 1, 3, 4, 5:
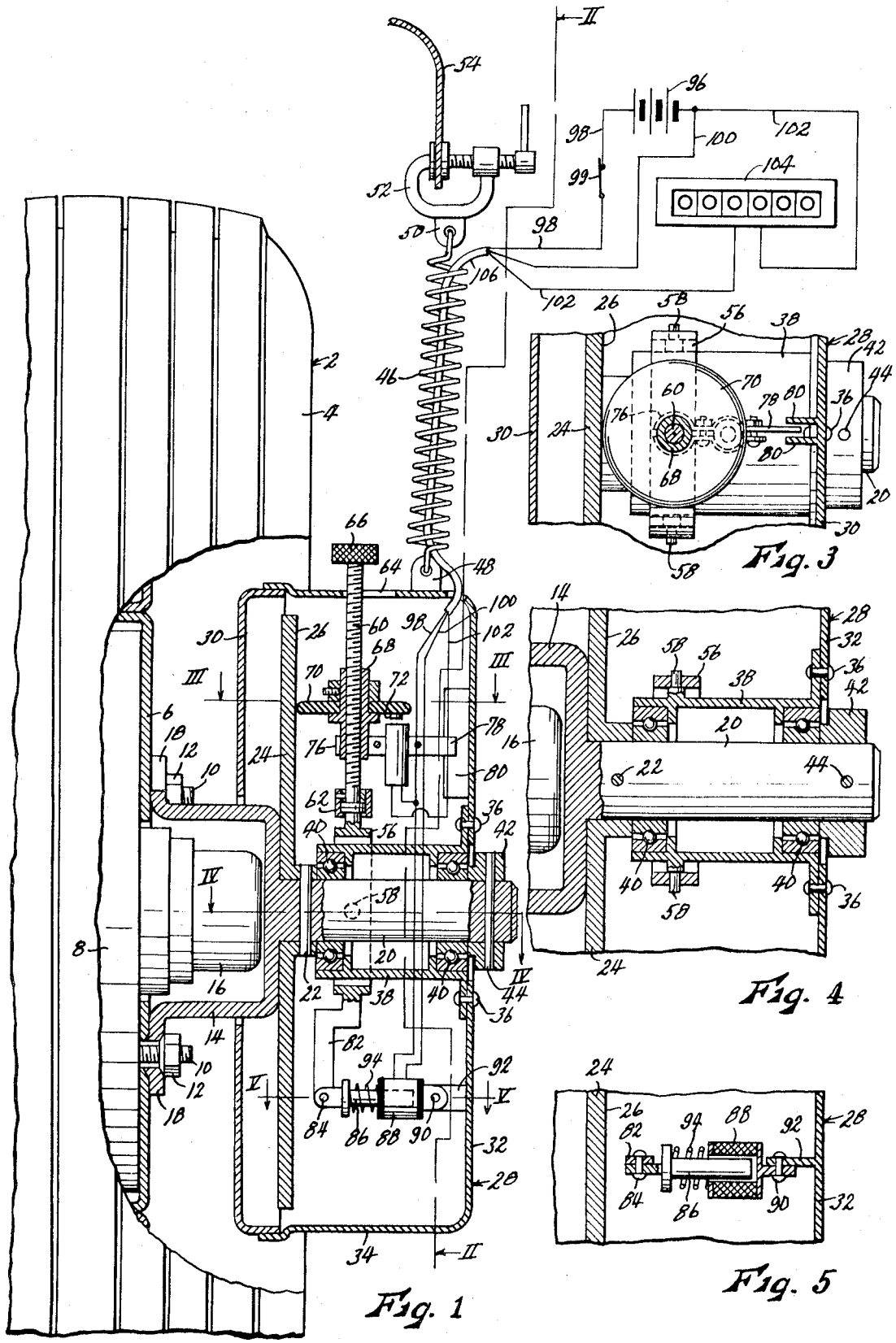

United States Patent [19]
Finley

[11] 3,735,103
[45] May 22, 1973

[54] ODOMETER
[76] Inventor: Carl E. Finley, 401 East 4th Street, Lamar, Mo. 64759
[22] Filed: Dec. 13, 1971
[21] Appl. No.: 207,258

[52] U.S. Cl. .................................. 235/95 R, 235/95 B
[51] Int. Cl. .................................................. G01c 22/00
[58] Field of Search .................... 235/95 R, 96, 95 B; 33/141 R, 142, 141 D

[56] References Cited
UNITED STATES PATENTS
2,665,897  1/1954  Mollenhour .................. 235/95 R
3,357,636  12/1967  Ferro, Sr. ...................... 235/95 R Primary Examiner—Stephen J. Tomsky
Attorney—John A. Hamilton

[57] ABSTRACT

An odometer for automotive vehicles consisting of a planar disc affixable to a wheel of the vehicle, concentrically therewith and parallel to the plane thereof, a roller carried rotatably on an axis radial to the wheel but not rotatable with the wheel, and frictionally engaging the disc whereby to be rotated on its axis as said vehicle travels, a mechanism operable to count and record the number of revolutions of the roller, and adjusting mechanism for moving the roller radially of the disc to engage and be actuated by different diameters of the disc, whereby to adjust the ratio of the rotative speeds of the vehicle wheel and the roller.

4 Claims, 5 Drawing Figures

ODOMETER

This invention relates to new and useful improvements in odometers for measuring the distance travelled by automotive vehicles and has as its principal object the provision of an odometer capable of measuring short distances of vehicle travel, say, distances of 500 feet or less although the device is capable of measuring any distance, with far greater accuracy than is possible with the odometers customarily furnished in automotive vehicles.

The customary vehicle odometer indicates tenths of miles as its least recorded increment, and smaller increments, while they can be estimated, cannot be estimated with any great accuracy. While this accuracy may be sufficient for the general purposes of the traveller, there are many instances, particularly in engineering operations, where greater accuracy is to be desired. For example, an engineer may desire to use a vehicle odometer for marking the positions at which telephone poles are to be set in the ground, or for various measurements to be made in highway work. Also, the usual vehicle odometer is gear driven from the vehicle transmission, so that in effect it is merely counting the revolutions of a driven, ground-engaging wheel of the vehicle. The driven wheels of a vehicle often skid or slip to a considerable degree on the road surface, particularly during periods of acceleration and deceleration or when driving on dirt, gravel, or other loose-surfaced roadways, and this introduces error into the odometer reading. Also, the odometer reading is affected by tire wear and tire inflation pressure, since both tire wear and reduction of tire pressure reduce the effective wheel diameter and circumference, and hence reduce the distance the vehicle actually travels per revolution of the wheel. The present odometer eliminates or greatly reduces inaccuracies from any of these causes, first because it is mounted on and driven by an unpowered vehicle wheel, which does not slip or skid on the road surface to any appreciable degree at all so long as the vehicle is driven at a low speed, and in any event much less than a powered wheel, and second by virtue of the fact that it includes easy and convenient adjusting means for varying the ratio of the odometer rate to the speed of wheel rotation whereby to compensate for tire wear and for variations of tire pressure.

Another object is the provision of an odometer of the character described having novel means whereby it may be actuated or deactuated as desired, in order to avoid excessive wear thereon during periods of non-use.

Other objects are simplicity and economy of structure, and efficiency and dependability of operation.

Figure 2:
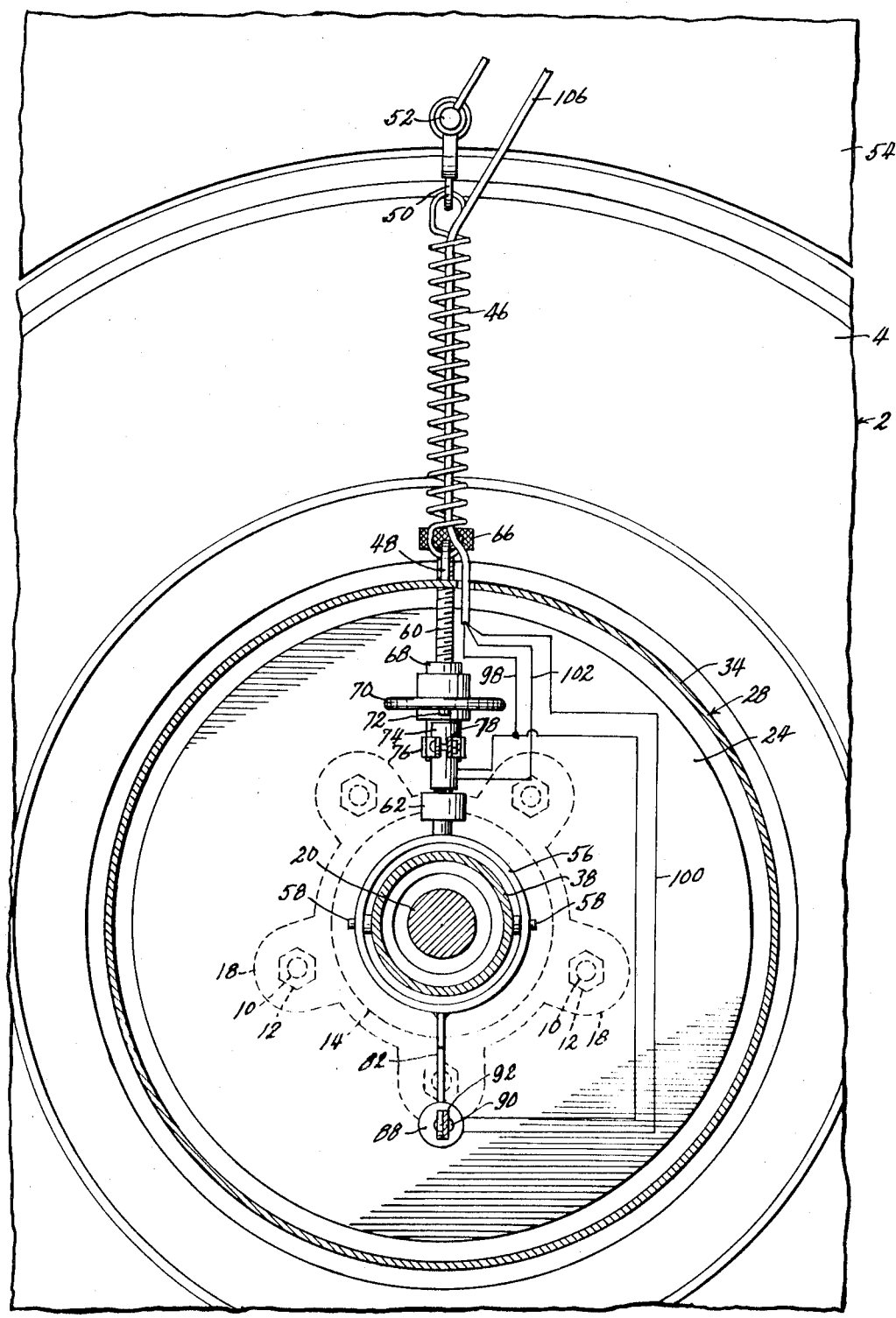

With these objects in view, as well as other objects which will appear in the course of the specification, reference will be had to the accompanying drawing, wherein:

FIG. 1 is a fragmentary edge elevational view of a vehicle wheel having an odometer embodying the present invention mounted operatively thereon, with parts broken away and shown in section, and including a schematic wiring diagram, FIG. 2 is a sectional view taken on line II—II of FIG. 1, FIG. 3 is an enlarged, fragmentary sectional view taken on line III—III of FIG. 1, FIG. 4 is an enlarged, fragmentary sectional view taken on line IV—IV of FIG. 1, and FIG. 5 is an enlarged, fragmentary sectional view taken on line V—V of FIG. 1.

Like reference numerals apply to similar parts throughout the several views, and the numeral 2 applies generally to a vehicle wheel having a pneumatically inflated tire 4, and including a rigid wheel disc 6 removable secured to the brake drum 8 by threaded lugs 10 and lug nuts 12, all as common and well known in the art. For reasons already mentioned, it is preferable that wheel 2 be an unpowered wheel of the vehicle, such as a front wheel of a vehicle having a rear wheel drive, and vice versa.

The odometer as contemplated by the present invention includes a heavy, rigid cup-shaped hub member 14 fitted coaxially over the grease cup 16 of the wheel hub, and having integral, radially extending ears 18 at its open end which are engaged on lugs 10 and secured by lug nuts 12. Formed integrally with hub member 14 is an outwardly extending stub shaft 20, which is accurately coaxial with wheel 2. Mounted fixedly on shaft 20 by pin 22 is a rigid planar disc 24, said disc being coaxial with said shaft with its outer face 26 lying in accurately parallel relation to the plane of wheel 2. Shaft 20 and disc 24 of course rotate with wheel 2 as the vehicle travels.

Disc 24 is enclosed in a non-rotating cylindrical case 28, said case being formed in detachable sections as shown for purposes of assembly, and including circular inner and outer end walls 30 and 32 disposed normally to shaft 20, and a cylindrical peripheral wall 34 coaxial with said shaft. Outer end wall 32 of the case is affixed, as by rivets 36, to a cylindrical hub 38 coaxial with shaft 20, and rotatably mounted thereon by ball bearings 40. Said hub is secured on said shaft by a collar 42 fixed on the free end portion of said shaft by pin 44. Case 28 is prevented from rotating with shaft 20 by a helical tension spring 46 engaged at its lower end in an ear 48 fixed to the top of said case, and engaged at its upper end in an ear 50 carried by a C-clamp 52 which may be clamped on a convenient fixed element of the vehicle, such as fender 54.

Loosely encircling hub 38, within case 28, is a circular yoke 56, said yoke being pivotally mounted on a pair of stub shafts 58 affixed to and projecting oppositely outwardly from hub 38, said stub shafts being coaxial and disposed at right angles to the axis of shaft 20. Projecting upwardly from yoke 56, at right angles to the pivotal axis of the yoke, is a threaded screw 60. Said screw is affixed at its lower end to said yoke, but has a swivel fitting 62 interposed therein just above said yoke, whereby the major threaded portion thereof may be rotated about its axis. Said screw extends upwardly through an opening 64 provided therefor in the peripheral wall 34 of the case, and is provided at its exposed upper end with a knurled knob 66 by means of which it may be turned manually. Opening 64 is slotted as shown to permit pivoting of yoke 56 on stub shafts 58. Mounted operably on screw 60, within case 28, is an elongated internally threaded nut 68. Mounted coaxially on nut 68, for rotation relative thereto, is a flat, circular roller 70 which is operable by pivotal movement of screw 60 and yoke 56 on shafts 58 to be moved into or out of engagement with face 26 of disc 24.

A permanent magnet 72 is mounted on the lower face of roller 70, eccentrically to screw 60. Once during each revolution of roller 70, said magnet passes in closely spaced relation to a proximity switch 74 which is mounted rigidly on nut 68 beneath said roller by means of a bracket 76, whereby a proper relationship between the magnet and switch is maintained when nut 68 is moved along screw 60. To prevent nut 68 from turning with screw 60, bracket 76 is provided with a finger 78 projecting radially from screw 60 and having its extended end portion confined loosely between a pair of vertical, parallel, spaced apart ears 80 fixed to end wall 32 of case 28. Proximity switch 74 is not detailed, but is common and well known in the electrical art, consisting broadly of an electric switch operable to be actuated each time a magnet is brought into close proximity therewith.

Fixed to yoke 56, and extending downwardly therefrom in case 28 generally oppositely to screw 60, is a leg 82 which is pivoted at its lower end, as at 84, to the movable armature 86 of a solenoid coil 88 which is in turn pivoted, as at 90, to an ear 92 affixed to case wall 32. The solenoid axis is disposed angularly to leg 82, and the solenoid is provided with a spring 94 biasing armature 86 to an extended position, wherein it pivots leg 82, yoke 56 and screw 60 on shafts 58 in a clockwise direction as viewed in FIG. 1 to move roller 70 out of engagement with disc 24, as far as permitted by finger 78. When the solenoid is energized, it pivots these parts in a counterclockwise direction on shafts 58 to draw roller 70 into firm engagement with disc 24, whereby said roller is turned when said disc rotates responsively to travel of the vehicle. Roller 70 may be formed of firm rubber or other suitable material for insuring a non-slip engagement thereof with the disc.

A source of electric power 96, which may be the usual vehicle battery, has one terminal thereof connected by wire 98 to one terminal each of switch 74 and solenoid coil 88, through a manually operable control switch 99. The other battery terminal is connected by wire 100 with the other terminal of coil 88, and by wire 102 with the other terminal of switch 74, in series with an electrically operable counter 104. Thus when switch 99 is closed, solenoid coil 88 is energized to urge roller 70 against disc 24, and switch 74 and counter 104 are connected in series to battery 96, so that each revolution of roller 70 is indicated by advancement of counter 104. Switch 99 and counter 104 are preferably of course mounted within the vehicle at a position convenient to the driver. Wires 98, 100, and 102 may be enclosed in a flexible cable 106 extending through spring 46, as shown.

In operation, with solenoid coil 88 energized to urge roller 70 against face 26 of disc 24, as already described, it will be seen that as wheel 2 turns during travel of the vehicle, disc 24 also turns and causes roller 70 to rotate, whereby its magnet 72 actuates proximity switch 74 once during each revolution to advance counter 104 one digit. The counter thus records the vehicle travel in whatever increments the counter may be calibrated. It is generally desirable that the counter indicate a small, convenient unit, such as one foot, for each digit it advances, although other units, such as yards or meters, could be used if desired. For this purpose, it is necessary to maintain the ratio $$R_1/R_2 = R_2/R_3 \text{, where}$$

$R_1$ = the effective radius of tire 4, where it is compressed and depressed by engagement with the road surface, $R_2$ = the effective radius of disc 24 (i.e. the radius of the track thereof engaged by roller 70), and $R_3$ = the radius of roller 70, all measured in the desired unit of travel to be indicated.

As long as this equality is maintained, counter 104 will indicate vehicle travel accurately in the desired units of length. Conveniently, with a tire 4 having an $R_1$ of 12 inches, and a roller 70 with a 1 inch radius, the roller should be set on disc 24 by turning screw 60 to produce an $R_2$ in inches equal to the square root of 12.

The maintenance of the equality expressed in the above equation is not a simple matter. $R_3$ may generally be regarded as a constant, although even this may change as the rim of the roller wears in use. The effective tire radius $R_1$, however, is subject to variation from a number of causes. Tires of different constructions yield to different degrees where they are pressed against the road surface. Tire tread wear gradually reduces the $R_1$ factor, while increases and decreases of tire pressure respectively increase and decrease the effective tire radius. Moreover, the distance actually travelled by the vehicle per revolution of the wheel varies with such random factors as "rippling" of the tread and vibration or "bouncing" of the wheel against rough road surfaces. The present odometer does not compensate for these random factors and therefore does not provide absolute accuracy, but these random variations occur principally at higher speeds of travel, and can be greatly minimized by driving the vehicle at low speeds, say in the region of 15 miles per hour. Variations caused by tread wear and changes in tire pressure, can be compensated for by turning screw 60, by means of knurled knob 66, whereby to move roller 76 radially to shaft 20 to change the diameter of its track on disk 24, thus changing the $R_2$ factor of the equation to restore the equality expressed by the equation. This adjustment also can compensate for wear, and hence reductions of diameter and circumference, of roller 70 itself.

The odometer is preferably calibrated for use by first driving the vehicle over an accurately measured course of a convenient length, say 1,000 feet for example, observing any error in the reading of counter 104, and correcting the error by turning screw 60. A scale may be imprinted on case 28, adjacent knob 66, indicating the difference of counter reading which will be produced over a 1,000 foot course for each turn or fraction of a turn of screw 60, as an aid in making this adjustment. The calibration should be performed at a low speed, not in excess of perhaps 15 miles per hour, this low speed also being recommended in devices of this type for actual usage conditions, in order to minimize errors due to tire ripple or bounce. The calibration should also be performed with the tire 4 inflated to a pressure substantially at the midpoint of the range of pressures considered to be normal and acceptable, say at 25 psi as the midpoint of a 20–30 psi range. The calibration should be carried out again at periodic intervals.

Tests show that if the calibration is performed as described, the odometer will maintain an accuracy of ± one-half percent so long as the tire pressure is maintained anywhere in the 20–30 psi range, at least until other factors such as tread or roller wear take effect, at which time the device should be re-calibrated. This accuracy is acceptable for most contemplated usages of the odometer, although of course much greater accuracy is obtainable by more frequent calibrations, and by accurate maintenance of the tire pressure at the calibration pressure. With these precautions, the accuracy of the odometer is limited only by the accuracy of calibration which may be obtained with care and patience.

The yieldability of spring 46, which prevents case 28 from rotating with stub shaft 20, permits the odometer to be mounted on a steerable vehicle wheel which turns about a vertical axis relative to fender 54. As previously mentioned, the odometer is preferably mounted on an unpowered vehicle wheel, which is usually but not always a steerable wheel, since unpowered wheels have much less slippage relative to the road surface than powered wheels. Case 28, and hence screw 60 and roller 70, may still oscillate slightly about shaft 20, but any errors introduced by such oscillations are self-cancelling and do not affect the reading of counter 104. Spring 46 also permits vertical movement of wheel 2 relative to fender 54, since virtually all automotive vehicles have yieldable wheel suspension systems.

Proximity switches 74 which may be reliably actuated at least 50 times per second are readily available. With only one magnet 72 mounted on roller 70, and the device calibrated to indicate travel in feet, said switch would operate to actuate counter 104 effectively at vehicle speeds of 50 feet per second, which corresponds to nearly 35 miles per hour. This is much higher than the 15 mile per hour limit recommended for actual usage of the odometer. When the odometer is not in use and the vehicle is being driven at much greater speeds, switch 99 is opened, whereby solenoid spring 94 moves roller 70 out of engagement with disc 24, and excessive wear and possible damage to the counter mechanism is prevented.

As shown, the least increment of travel indicated by counter 104 is one foot, since one foot of vehicle travel produces one revolution of roller 70. This can cause an error of nearly one foot in the reading of counter 104, if at the end of a course being measured magnet 72 approaches switch 74 but not quite close enough to actuate the switch. While accuracies in fractions of a foot may seldom be necessary, they could be provided in the present device by placing either more magnets 72 on roller 70 or more proximity switches 74 in bracket 76, distributed angularly about screw 60. For example another magnet 72 affixed by roller 70 180° from that shown, or another switch 74 carried by bracket 76 180° from that shown, would reduce the least increment of counter 104 to 6 inches, and so on.

While I have shown and described a specific embodiment of my invention, it will be readily apparent that many minor changes of structure and operation could be made without departing from the spirit of the invention.

What I claim as new and desire to protect by Letters Patent is:

1. An odometer for use in connection with an automotive vehicle having a ground-engaging wheel including a rigid portion and a pneumatically inflated tire, said odometer comprising:
   a. a disc having a planar face,
   b. a disc mount affixable to a rigid portion of said wheel whereby said planar disc face is disposed parallel to the wheel plane and concentrically to the wheel axis, and is rotatable with said wheel,
   c. a roller mount including a hub mounted on said disc mount for rotation relative thereto about the wheel axis, and a rod-like member carried by and extending generally radially from said hub,
   d. securing means preventing rotation of said roller mount with said disc mount,
   e. a roller carried by said rod-like member coaxially therewith and for rotation relative thereto with its periphery in frictional engagement with said planar disc face in spaced apart relation from said wheel axis,
   f. manually actuated adjusting means to vary the spacing of said roller from said wheel axis, comprising means operable to move said roller axially along said rod-like member, and
   g. counting means operable to count and record the revolutions of said roller.

2. An odometer as recited in claim 1 wherein said rod-like member comprises a screw carried by said hub for manual rotation about its own axis, and wherein said roller mount further includes:
   a. a threaded nut mounted operatively on said screw, said roller being rotatably mounted on said nut, and
   b. means preventing rotation of said nut with said screw but permitting movement of said nut axially along said screw.

3. An odometer as recited in claim 1 wherein said rod-like member is connected pivotally to said hub for movement about an axis generally at right angles to both the hub axis and said rod-like member, whereby said roller may be moved selectively into or out of engagement with said desc, and with the addition of:
   a. resilient means biasing said rod-like member in a direction to move said roller out of engagement with said disc, and
   b. electrically operable pivoting means operable when energized to move said rod-like member pivotally against said resilient biasing means to urge said roller against said disc.

4. An odometer as recited in claim 1 wherein said rod-like member constitutes an elongated screw carried by said hub for manual rotation about its own axis and for pivotal movement about an axis generally at right angles both to the hub axis and said screw, whereby said roller may be moved into and out of engagement with said disc; said roller mount further including a nut operably mounted on said screw and movable axially therealong in response to rotation thereof, and means preventing rotation of said nut with said screw; wherein said counting means includes an electric switch mounted on said nut so as to be movable along said screw with said nut, a switch actuator carried by said roller and operable to actuate said switch once during each revolution of said roller, an electrically operated counter, and an operative electric circuit including said switch, said counter and a source of electric power; and with the addition of:
   a. resilient means biasing said screw pivotally in a direction to move said roller out of engagement with said disc,
   b. electrically operated pivoting means operable when energized to pivot said screw to urge said roller against said disc,
   c. an operative electric circuit including said pivoting means and a source of electric power, the operative circuits of said counter and said pivoting means including a conductor common to both circuits, and
   d. a normally operable control switch disposed in said common conductor.

* * * * *